Nov. 6, 1962
E. J. DE WITT
3,062,567
BRANCHED PIPE COUPLING
Filed Aug. 15, 1958
2 Sheets-Sheet 1
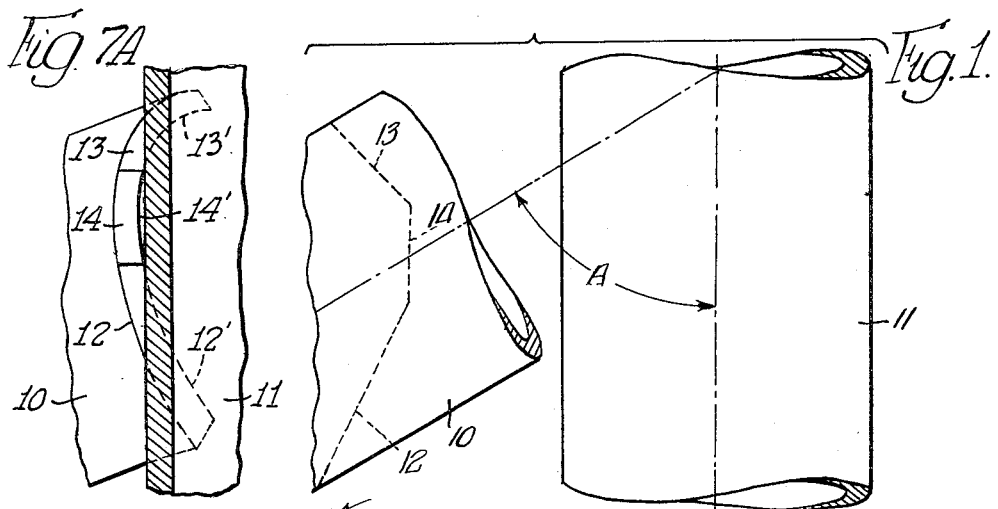
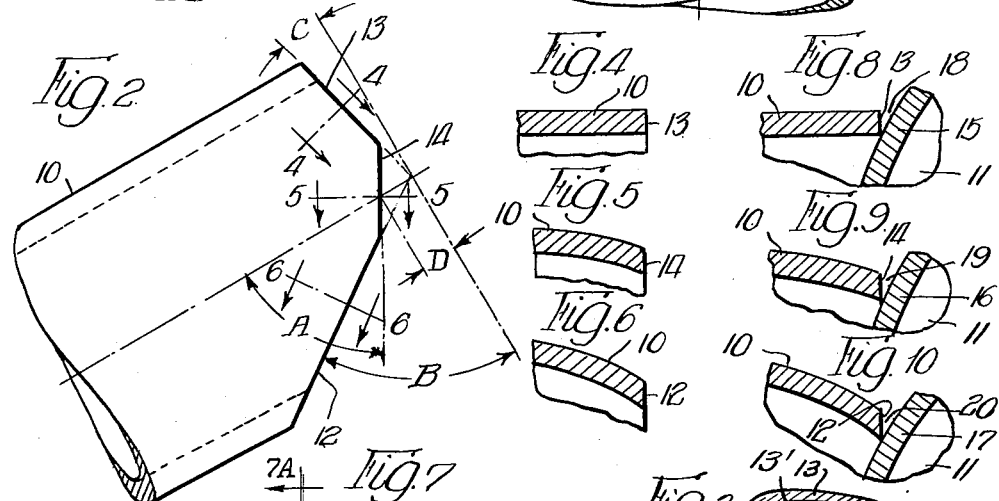
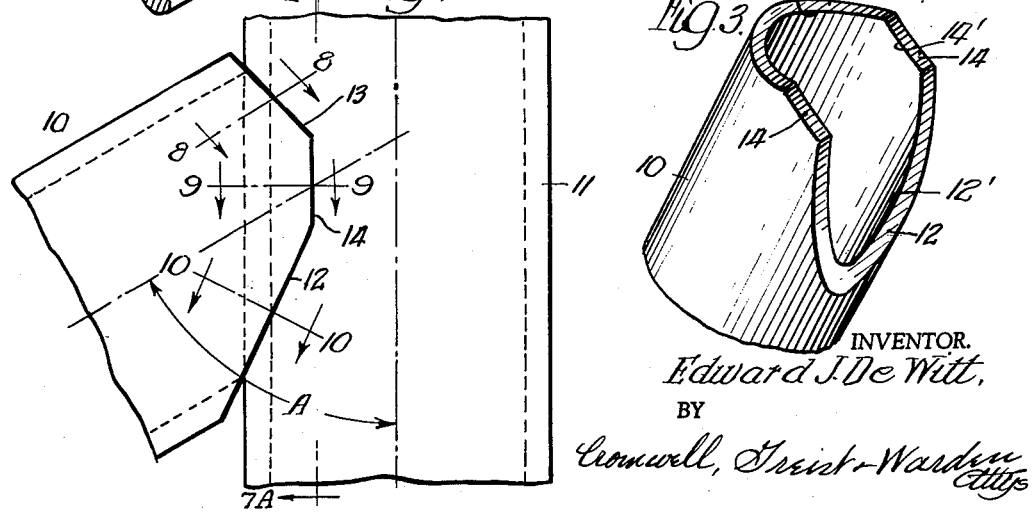
INVENTOR.
Edward J. De Witt,
BY
Cromwell, Greist & Warden
Attys

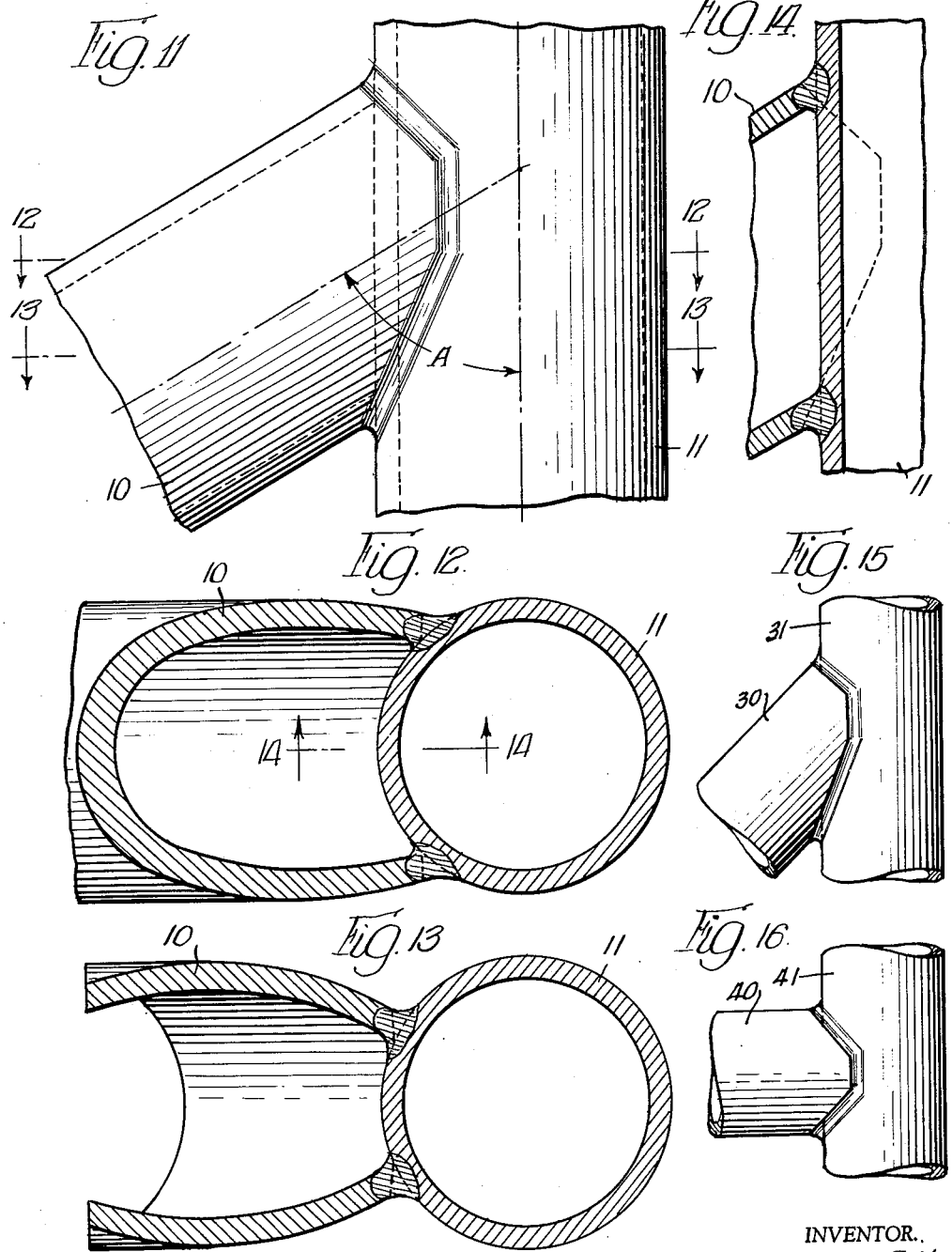

United States Patent Office 3,062,567
Patented Nov. 6, 1962

3,062,567
BRANCHED PIPE COUPLING
Edward J. De Witt, Winnetka, Ill., assignor to Wallace Supplies Manufacturing Company, Chicago, Ill., a corporation of Illinois
Filed Aug. 15, 1958, Ser. No. 755,296
5 Claims. (Cl. 285—189)

This invention relates to the joining of tubular members and is more particularly concerned with procedures for cutting, fitting and securing the end of one tubular member to the side wall of another tubular member to form an improved structural or fluid connection between the members.

In the procedures generally employed heretofore for joining the end of a tubular section to the wall of another tubular section by welding operations which involve the use of a filler material, difficulties have been encountered in obtaining mating surfaces of a character which will result in a satisfactory joint. Also the procedures employed for preparing the tubular sections for receiving the connecting material have been time consuming or required the use of equipment which is so expensive or requires so much time for the operations or for setup that the use of this type joint has been limited. It has long been recognized that more extensive use would be made of this type joint if improved procedures for making the joint could be devised which would materially reduce the time required for preparing the sections and effecting the weld without involving the use of expensive machinery. It is a general object of the invention therefore to provide a system of joining tubular sections wherein the tubular sections are prepared, by relatively simple operations which may be carried out with inexpensive equipment, to meet with other tubular sections in such a manner as to provide a mating contact area with the conformation of the mating areas being such that a nearly ideal condition is provided for the welding of the one section to the other.

It is a more specific object of the invention to provide a procedure for forming a joint between the end of one tubular section and the side wall of another tubular section by welding or the like wherein the end of the one section is prepared so as to form when placed against the other section mating contact areas providing welding conditions which approach the ideal and wherein simple equipment may be employed for preparing the end of the one section much more rapidly than has heretofore been possible with the procedures and the equipment generally employed.

It is another object of the invention to provide a system for connecting tubular sections wherein the sections are provided with mating contact areas providing nearly ideal welding conditions by simple procedures and with the use of relatively inexpensive equipment.

It is a further object of the invention to provide a method of forming a welded connection between an end of a tubular section and the side wall of another tubular section at a desired angle wherein the end of the first tubular section is prepared for the welding operation by three cuts which are in planes extending transversely of the longitudinal axis of the section.

It is another object of the invention to provide a method of preparing the end of a tubular member for welding, brazing or the like to the wall of a second tubular member by cutting across the first member in three planes which extend transversely of the longitudinal axis of the member and which are at predetermined angles to each other with the middle cut intersecting the other two cuts and being located at a predetermined point along the longitudinal axis of the member, so as to provide on the end edges of the wall of the first member plane surfaces which when the end of the first member is abutted against the wall of the second member form with the wall of the second member outwardly opening generally V-shaped grooves for receiving a connecting filler material such as welding, brazing or the like metal.

It is still another object of the invention to provide a method of connecting two tubular sections to form a joint at a predetermined angle wherein the end of the one section is prepared for the joining by cutting across the same on three planes which are in predetermined relation to each other so that when the end of the first section is placed in abutting relation with the side wall of the second section at the desired angle the inside edge of the wall of the first section will form substantially a line contact with the outside surface of the wall of the second section and the cut wall surfaces on all three cutting planes of the first section will form with the adjacent outside wall surfaces of the second section outwardly opening V-shaped grooves for receiving a connecting material such as welding or brazing metal.

A further object of the invention is to provide a process of cutting, fitting and securing the end of a circular pipe to the side wall of another circular pipe at a predetermined angle which consists in making three cuts in the end of the first pipe in three different transverse planes, each of which is at a predetermined angle to the longitudinal axis of the pipe, positioning the cut end of the first pipe against the outside wall of the second pipe so that outwardly opening V-shaped grooves are formed between the cut surfaces of the first pipe and the confronting side wall surfaces of the second pipe and filling the grooves with the welding material to form a welded connection between the same.

These and other objects and advantages of the invention will be apparent from a consideration of the procedures and the joints formed thereby which are herein described and illustrated in the accompanying drawings wherein:

FIG. 1 is a plan view of two sections of pipe of the same dimensions which are positioned in a predetermined angular relation to each other in which it is desired to rigidly and permanently connect the same, the two sections being shown prior to the preparation of the end of the one section for forming the joint;

FIG. 2 is a plan view of the end of the section of pipe which is to be joined to the side wall of another section of pipe, after it has been prepared for making the joint by cutting the same on three planes having a predetermined relationship to each other;

FIG. 3 is a prespective view of the cut end of the pipe section shown in FIG. 2;

FIGS. 4, 5 and 6 are fragmentary sections taken on the lines 4—4, 5—5 and 6—6 of FIG. 2;

FIG. 7 is a plan view similar to FIG. 1 with the end of the pipe which is to be joined to the side wall of the other pipe cut as in FIG. 2 and placed in abutting relation against the side wall of the other pipe preparatory to forming a permanent connection with the same;

FIG. 7A is a cross section taken on the line 7A—7A of FIG. 4;

FIGS. 8, 9 and 10 are fragmentary sections taken on the lines 8—8, 9—9 and 10—10 of FIG. 7;

FIG. 11 is a view similar to FIG. 7 illustrating the joint when it is completed;

FIG. 12 is a section taken on the line 12—12 of FIG. 11;

FIG. 13 is a section taken on the line 13—13 of FIG. 11;

FIG. 14 is a fragmentary section taken on the line 14—14 of FIG. 12;

FIG. 15 is a plan view to a smaller scale illustrating a pipe joint with the pipes at a different angle from that shown in FIG. 11; and FIG. 16 is a view similar to FIG. 15 of a pipe joint in which the pipes are at a right angle to each other and form a T joint.

Referring to the drawings the invention is illustrated in connection with the joining of the end of one tubular member to another tubular member so as to provide a structural connection with the members at a particular angle. However, the invention is equally applicable to the forming of fluid joints and the joints may be made with the members connected at any angle desired. Also the tubular members may be of different sizes and have walls of different thicknesses and the joining procedure may be used to connect members made of different materials such as steel, stainless steel, brass, copper, aluminum, alloys and the like. It is, of course, understood that in filling the groove formed by the mating surfaces to provide the permanent connection between the members connecting or welding material will be used which is of a character suitable for joining the particular materials of which the members are made.

In the structural connection or joint which is illustrated in FIGS. 1 to 14 inclusive of the drawings the tubular section or pipe 10 has its end joined to the tubular section or pipe 11 with the two pipes having the same wall thickness and being of the same diameter. For the purposes of illustration sections of aluminum pipe are shown having two inch diameter with a .135 inch wall thickness and the angle A (FIGURE 1) which is subtended by the intersecting longitudinal axes of the pipe sections when the joint is completed is 60°.

In forming a joint with the two pipe sections or members 10 and 11 at 60° angle and having the dimensions referred to, the pipe section 10 is prepared by providing an end on the same which has edge surfaces in three transverse planes, with the latter having a relationship to each other which is determined by the angle A and the dimensions of the pipe. The three edge surfaces 12, 13 and 14 on the pipe section 10 (FIGURES 2 to 7) which are provided in preparation for the welding or like connecting operation are obtained by making three cuts across the pipe with a tool which cuts on a single plane surface. The cuts to provide the surfaces 12, 13 and 14 are made in planes which are at right angles to a common diametrical plane extending through the longitudinal axis of the pipe section 10. The planes in which the cuts are made are in predetermined relation to each other depending upon the angle of the joint, and the diameter and wall thickness of the pipes.

In forming the 60° joint with two inch aluminum pipe having .135 inch wall thickness, as illustrated, the first cut to provide the edge surface 12 is taken in a plane which is at an angle of 55° relative to a transverse plane which is normal to the longitudinal axis of the pipe 10, this angle being indicated at B in FIG. 2. The second cut to provide the edge surface 13 is made while holding the pipe against any axial rotation with the plane of the cut at angle of 14° relative to the same transverse plane and in the direction of the long axis of the pipe this angle being indicated at C on FIG. 2. The third cut to provide the edge surface 14 is made also while holding the pipe against any axial rotation but after it has been moved along its axis a disttance which is indicated at D in FIG. 2 and which is 5/16 inch from the point of intersection of the planes of the first two cuts with the longitudinal axis of the pipe, and at an angle of 30° relative to the same transverse plane. Thus, the third cut is made on a plane which is spaced or offset in the direction of the body of the pipe 10 a predetermined distance from the intersection of the planes of the first two cuts and at the same angle relative to the longitudinal axis of the pipe as the angle of the joint. The angles on which the first two cuts are made and the distance which the pipe is moved on its longitudinal axis for making the third cut depend upon the diameter and wall thickness of the pipes being joined and also upon the angle of the joint. These values may be determined for various joints and pipes of various diameters and wall dimensions, for example, by cut and try methods, that is, by cutting the end of the pipe which is to be joined and fitting it to the side wall of the pipe to which it is to be joined, making as many adjustments in the cutting angles for the two side cuts and in the distance the pipe is moved along its axis for the third cut as required and recording the final values when a satisfactory fit is obtained. The values obtained may be compiled in the form of permanent tables for use in carrying out the procedure herein described to provide joints of any desired angle with pipes of different dimensions, separate values being necessary for each set of conditions with the values changing when any one of the three variables are changed, that is, the diameter of the pipe, its wall thickness and the angle of the joint. The cuts on the pipe section 10 to form the edge faces 12, 13 and 14 may be most conveniently accomplished by the use of the equipment which is disclosed in my co-pending application Serial No. 755,297 filed concurrently herewith.

When the end of the pipe section 10 has been cut on the three planes as described the resulting edge surfaces 12, 13 and 14 are as shown in FIGS. 4, 5 and 6 and the pipe is then in condition for placing the end thereof in engagement with the side wall of the pipe section 11 to which the section 10 is to be joined. When the end of the pipe 10 is positioned against the outside surface of the cylindrical wall of the pipe section 11 with the axes of the two pipes at a 60° angle as shown in Figure 7 for the welding or like operation which forms a permanent connection between the end of section 10 and the side wall of section 11, the inside edges, where the inner wall and the cut surfaces intersect, which edges are indicated at 12', 13' and 14' in FIG. 3, are substantially in line engagement with the outside wall surface of the pipe section 11, as shown in FIGURES 8, 9 and 10, so that the edge faces 12, 13 and 14 form with the confronting wall sections 15, 16 and 17, respectively, outwardly opening generally V-shaped slots, 18, 19 and 20. As shown in FIGURE 7A, when the welding surfaces 12, 13 and 14 are properly cut they are each in a single flat plane and very nearly perfect line contact is obtained between the curved edges 12' and 13' and the cylindrical surface of pipe 11 while the ends of the edge 14' contact the pipe wall and the intermediate portions are spaced slightly therefrom due to the curvature, the latter approaching more nearly line contact as the length thereof is shortened or the diameter of the pipe is increased. The V-shaped slots 18, 19 and 20 form a continuous groove around the entire periphery of the cut end of the pipe section 10 for receiving welding material to form a permanent connection between the end of the section 10 and the wall of the section 11. The slot 19 will have a slight opening at the bottom in the middle portion of the edge 14' due to the relatively slight outward curvature but the opening is so small that it has practically no effect on the final weld.

With the pipe sections 10 and 11 positioned as shown in FIG. 7, and with the end of the section 10 provided with the edge faces or surfaces 12, 13 and 14, adequate metal may be filled into the resultant V grooves 18, 19 and 20 in making the weld connection to effect a highly satisfactory weld around the entire periphery of the joint as illustrated in FIGURES 11 to 14. With suitable welding material and skillful welding technique joints may be formed in which the V-outline of the confronting or mating surfaces of the two sections 10 and 11 is not distinguishable and in which the weld integrally joins the end of the section 10 to the wall of the section 11 with the boundaries of the weld areas very nearly indistinguishable as illustrated in FIGURES 12 to 14.

In FIGURES 15 and 16 two joints are illustrated with the pipes at different angles to each other, the pipe which is to be cut being in each instance provided with end edge faces which are in three intersecting planes so that when the one pipe is abutted against the side wall of the other pipe outwardly opening grooves are formed for receiving the welding material. In FIGURE 15 the two pipes 30 and 31 are joined at an angle of 45° while in FIGURE 16 the two pipes 40 and 41 are joined at a right angle to each other so as to form a T joint.

In all of the forms illustrated the joint is made between pipes which are positioned with their longitudinal axes in a common plane and the three cuts which are made on the end of the pipe to prepare it for forming the joint are in planes at right angles to a common plane which passes through the longitudinal axes of the pipes. This is the normal arrangement usually made with pipes of identical dimensions. However, it may be desirable to form a joint in which the end of a pipe of a certain size will be joined to the side wall of a pipe of larger size with the axis of the smaller pipe in a plane which is parallel to and offset from the plane in which the axis of the larger pipe lies. In preparing the end of the smaller pipe for making the joint three cuts will be made across the pipe but the planes in which the three cuts are made will not be at right angles to a common plane passing through the longitudinal axes of the pipes as in the normal joint arrangement. However, by proper cutting on the three planes the pipe end may be prepared to form such a joint with the cut end edges cooperating with the side wall of the larger pipe to provide a substantially V-shaped outwardly opening groove for receiving the weld material as in the illustrated forms of the invention.

While the illustrated form of the joint shows a structural connection a fluid joint may be obtained by the same procedure merely by cutting or drilling an aperture in the portion of the side wall of the pipe which is within the confines of the connected faces when the joint is completed.

I claim:

1. In a pipe joint comprising two cylindrical pipe sections, one of said pipe sections having its end fitted against the wall of the other pipe section with the axes of the two pipe sections at a predetermined angle to each other, the end of said one pipe section being provided with welding faces which are produced by cutting straight across the pipe wall in three separate transverse planes, two of said planes extending in converging relation from opposite sides of said one pipe section toward the axis thereof and the third one of said planes extending parallel to the axis of said other pipe section and interesecting the two converging planes, each of said welding surfaces being characterized by a flat planular welding surface which is disposed entirely within a single plane and which is provided along its inner margin with an edge curved in said plane and substantially contacting with the wall of said other pipe section throughout its length, said planular welding surfaces each diverging at all points throughout its length from the cylindrical outside surface of the wall of said other pipe section whereby said welding surfaces form with said wall an outwardly opening V-shaped groove which extends around the entire cut end of said one pipe section and which is adapted to be filled with a weld forming material.

2. In a pipe joint comprising two cylindrical pipe members positioned at a predetermined angle to each other and in substantially a common plane, one of said pipe members having an end thereof which is cut on three separate planes each extending straight through the wall of said one pipe member at a predetermined angle to the axis of said one pipe member to provide a flat planular welding surface, each of said welding surfaces being disposed entirely within a single plane and having a curved edge along its inner margin within said plane for contact with the cylindrical side wall of the other pipe member, all of said planes being perpendicular to said common plane, the middle one of said planular welding surfaces being in a plane extending parallel with the axis of said other pipe member and the other two planular welding surfaces being in planes extending outwardly in diverging relation from the opposite ends thereof, the entire inner edges of all three planular welding surfaces being substantially in line contact with the cylindrical surface of the side wall of said other pipe member and the outwardly extending portions of all of said planular welding surfaces diverging at all points from said side wall surface and cooperating therewith to form around the entire cut end of said one pipe member an uninterrupted outwardly opening groove of V-shaped cross section for receiving a weld forming material.

3. In a pipe joint as recited in claim 2 and said pipe members being positioned at an acute angle to each other.

4. In a pipe joint comprising two cylindrical pipe sections, one of said pipe sections having its end fitted against the wall of the other pipe section with the axes of the two pipe sections in substantially a common plane and at a predetermined angle to each other, the end of said one pipe section being provided with welding faces which are produced by cutting straight across the pipe wall in three separate transverse planes, two of said planes extending in converging relation from opposite sides of said one pipe section toward the axis thereof and the third one of said planes extending parallel to the axis of said other pipe section and intersecting the two converging planes, each of said welding faces being characterized by a flat planular welding surface which is disposed entirely within a single plane and which is provided along its inner margin with an edge curved in said plane and substantially contacting with the wall of said other pipe section throughout its length, said planular welding surfaces each diverging at all points throughout its length from the cylindrical outside surface of the wall of said other pipe section whereby said welding surfaces form with said wall an outwardly opening V-shaped groove which extends around the entire cut end of said one pipe section and which is adapted to be filled with a weld forming material.

5. In a pipe joint as recited in claim 4 and said pipe sections being at an acute angle to each other.

References Cited in the file of this patent

UNITED STATES PATENTS

| 1,966,403 | Durham | July 10, 1934 |
|---|---|---|
| (U.S. duplicate of Danish Patent No. 51,802) | | |
| 2,126,519 | Vogel | Aug. 9, 1938 |
| 2,479,578 | Langvand | Aug. 23, 1949 |

FOREIGN PATENTS

| 51,802 | Denmark | June 15, 1936 |
|---|---|---|
| 886,985 | Germany | July 9, 1953 |
| 1,092,797 | France | Nov. 10, 1954 |